United States Patent Office 2,841,570
Patented July 1, 1958

2,841,570

POLYMERIZATION OF FORMALDEHYDE

Robert Neal MacDonald, Wilmington, Del., assignor to E. I. du Pont de Nemours and Company, Wilmington, Del., a corporation of Delaware No Drawing. Application June 30, 1953
Serial No. 365,234

4 Claims. (Cl. 260—67)

This invention relates to polymerization processes and specifically to the polymerization of monomeric formaldehyde.

This is a continuation-in-part of copending application Serial No. 307,363, filed by R. N. MacDonald on August 30, 1952, now abandoned.

It is known that formaldehyde polymerizes at low temperatures in solvents in the presence of such catalysts as sulfuric acid, boron trichloride, and trimethylamine to brittle, unstable polymers.

It is an object of this invention to provide a new process for producing tough, stable polymers of formaldehyde. It is another object of this invention to purify the reaction medium, the monomeric formaldehyde, or both by utilizing a scavenging step prior to the final polymerization. Other objects will be apparent in the more detailed description of this invention.

The above objects are accomplished by prepolymerizing a minor portion, not more than about 20%, of the total monomeric formaldehyde which is to be polymerized, separating the polymer thus formed from the remaining monomer, and continuing the polymerization to produce a high molecular weight formaldehyde polymer.

In one method of operation anhydrous monomeric formadehyde is introduced into a liquid organic reaction medium which is a non-solvent for the polymer and which is contained in a reactor which has been purged of oxygen by sweeping it with an inert gas, provided with a thermometer, agitator, and means for adding catalyst. The reactor is maintained at a temperature from $-110°$ C. to $+100°$ C., and a portion, less than about 20%, of the formaldehyde permitted to polymerize. The polymer which forms during the prepolymerization step is removed from the reaction medium. A catalyst is then added to initiate the polymerization of the remaining formaldehyde, the addition being at such rate that the temperature remains within the range selected for operation. When the polymerization is complete the reaction mixture is filtered and the polymer dried, suitably at ordinary temperatures.

The examples which follow are submitted to illustrate specific preferred embodiments and not as limitations of the invention. Parts are by weight, unless otherwise stated, and inherent viscosities refer to measurements made at 0.5% concentration in p-chlorophenol containing 2% alphapinene at 60° C.

*Example I.*—Twenty-seven parts of liquid formaldehyde at solid carbon dioxide/acetone temperature (approximately $-80°$ C.) was poured into 420 parts of anhydrous diethyl ether and the solution stored overnight at this temperature. The small amount of polymer which had formed was removed by gravity filtration under a blanket of nitrogen. As the clear colorless solution was stirred rapidly under nitrogen and cooled by a Dry-Ice/acetone bath, a solution of 0.1 part tributylamine (0.06 mole percent) in 10.7 parts of anhydrous diethyl ether was added. The solution immediately became cloudy and gel particles were observed splashing on the walls of the flask. The solid carbon dioxide/acetone bath bubbled vigorously and additional solid carbon dioxide was added to maintain the low temperature. Stirring and cooling were continued for two days and thereafter filtered to separate the formaldehyde polymer which had formed. The formaldehyde polymer on the filter was washed with ether, then air- and vacuum-dried to give a yield of 20 parts (75% of theory) of product. Tough, translucent films were obtained by compression-molding at 175–180° C.

*Example II.*—Formaldehyde gas was passed into toluene at $-80°$ C. under 100 mm. pressure, whereupon partial polymerization occurred. The polymer which formed was removed by filtration and any monomer removed by distillation of the toluene. Five hundred twenty-two parts of this purified toluene was placed in a 2-liter flask equipped with a mechanical stirrer and gas inlets and outlets. As the solvent was stirred rapidly in a solid carbon dioxide/acetone bath, monomeric gaseous formaldehyde was passed into the solvent. The toluene solution of formaldehyde obtained was freed from the film of polymer on the walls of the flask and traces of floating solid by gravity filtration. The clear filtrate was then stirred rapidly under nitrogen at atmospheric pressure and held at $-70°$ C. as 0.0517 part of n-butylamine (0.024 mole percent) in 23.55 parts of ether was added gradually over a 40-minute period from a burette, causing the formation of a polymeric solid. White, granular formaldehyde polymer was obtained by recovering and drying the polymeric solid which had formed, and was found to have an inherent viscosity of 2.35. Tough, translucent films were formed under pressure at 200°–220° C.

The monomeric formaldehyde used in the above experiment was made by pyrolyzing alpha-polyoxymethylene under 100 mm. pressure, and purifying it by passage at this pressure through 12 U-shaped tubes maintained at $-40°$ C. Minor portions of polymer formed in these tubes during passage of the monomer.

*Example III.*—One hundred parts of monomeric formaldehyde, prepared and purified as described in Example II, were passed into 560 parts of anhydrous dimethyl ether at $-75°$ C. and the system filtered by gravity to give a clear solution which then was cooled to $-100°$ C. As the solution was stirred under nitrogen and maintained at this low temperature, 0.17 part (0.02 mole percent) of dry triphenylphosphine in 28 parts of anhydrous diethyl ether was added gradually over a period of 30 minutes. Stirring at the low temperature was continued for an additional 70 minutes, thereafter the system was filtered and the solid product on the filter washed with diethyl ether. The washed product was a white, granular formaldehyde polymer amounting to 60 parts (60% of theory). This product was found to have an inherent viscosity of 1.00. Tough, translucent films were formed under pressure at 190°–200° C.

*Example IV.*—Fifty parts of monomeric formaldehyde, prepared and purified as described in Example II, were passed into 600 parts of methylene chloride at $-80°$ C., and the solution filtered to remove small amounts of polymer. The clear solution was then warmed to $-30°$ C., and as it was stirred under nitrogen at this temperature, 0.0066 part (0.0021 mole percent) of tri-n-butylamine in 10 parts of methylene chloride was added. There was an immediate temperature surge to $-20°$ C. which dropped back slowly to $-30°$ C. over a 5-minute period. After 20 minutes the product was filtered to give 35 parts (70% of theory) of white, powdery formaldehyde polymer which was injection-molded at 185° C. to give smooth, tough bars.

*Example V.*—One hundred parts of monomeric formaldehyde, prepared and purified as described in Example II, were passed into 140 parts of anhydrous diethyl ether at —80° C. The solution was filtered under nitrogen to remove small amounts of polymer. As the clear solution was stirred and cooled at —80° C., 0.0017 part (0.0007 mole percent) of n-butylamine in 16 parts of diethyl ether was added gradually, maintaining the temperature at —80° to —68° C. After the addition of the n-butylamine the system was stirred for 1 hour in a solid carbon dioxide/acetone bath. Upon filtration, washing with ether, and air- and vacuum-drying, 38 parts (38% of theory) of white, granular formaldehyde polymer were obtained which had an inherent viscosity of 2.54. Tough, translucent films were formed under pressure at 190°–210° C.

*Example VI.*—One hundred parts of monomeric formaldehyde, obtained and purified as described in Example II, were condensed into 350 parts of anhydrous diethyl ether. The solution was freed of incipient polymer by gravity filtration, and as the clear filtrate was stirred rapidly under nitrogen at —75° to —70° C., 0.059 part of n-butylamine (0.024 mole percent based on formaldehyde) in 28 parts of anhydrous diethyl ether was added gradually over a period of 43 minutes. After an additional 45 minutes of stirring at —75° C., the reaction system was filtered and the snow-white, granular formaldehyde polymer was air- and then vacuum-dried. There were obtained 59 parts (59% of theory) of polymer with an inherent viscosity of 2.31. Tough, translucent films were obtained upon compression-molding at 200°–240° C.

*Example VII.*—In a series of runs formaldehyde monomer containing from 0.5 to 1.5% water was passed at a rate of from 3 to 4 pounds per hour through a tubular heat exchanger, which in some runs was a single tube exchanger and in other runs was a multi-tube exchanger. Tube materials which were tested included glass, copper, and stainless steel. The formaldehyde monomer entered the heat exchanger at about 50° C. and left the exchanger at temperatures ranging from 5° C. to 20° C., and thereafter was conducted immediately into the final polymerization reactor. A white, solid polymeric formaldehyde deposited on the walls of the heat exchanger tubes, the solid deposit amounting to about 10% by weight of the monomer passing through the exchanger. The exchanger coolant was refrigerated methanol maintained at a temperature from about —15° C. to about —25° C. Two identical heat exchangers were arranged in parallel so that when the pressure drop of the flowing monomer vapor became excessively high or the rate of heat exchange became excessively low, the second heat exchanger was switched on stream, while the first heat exchanger was taken off stream so that the deposited polymer could be removed by blowing out with live steam. The monomer which had been subjected to the prepolymerization treatment was polymerized to form high molecular weight polymeric formaldehyde.

In a comparative series of runs in which the prepolymerization step was omitted, the polymerization was undesirable, for example the rate of polymerization was not easily controlled in some instances and in other runs the polymer which was produced had a lower molecular weight, as measured by inherent viscosity determinations, than is desirable for highest quality polymers.

*Example VIII.*—Monomeric formaldehyde was passed through a series of three empty U-tubes maintained at about —15° C. and then passed through a series of two liquid scrubbers and thence into the final polymerization reactor. The scrubbers were glass vessels containing dry cyclohexane at room temperature. The formaldehyde monomer was introduced into the scrubber below the liquid level of the cyclohexane, causing the formaldehyde to bubble through the cyclohexane, and thence out of the first scrubber and through a second scrubber identical to the first. Polymeric formaldehyde particles formed in the cyclohexane scrubbing liquid continuously, and from time to time, polymeric particles and cyclohexane were drawn off the bottom of the scrubbing vessel while fresh cyclohexane was introduced to replace that amount drawn off. Polymer formed in the first scrubber but none formed in the second scrubber during this experiment. Approximately 10% by weight of the monomer was prepolymerized in the first scrubber while the remaining monomer was passed into a polymerization reactor containing 956 parts of dry cyclohexane, 0.16 part of tri-n-butylamine, and 0.1 part of diphenylamine. The reactor was maintained at a temperature of 25° C. During the period of 1.6 hours the above monomeric formaldehyde was continuously passed into the cyclohexane reaction medium and polymer formed continuously during this same period. The product dispersion was a very fluid slurry which was filtered to recover 25 parts of a fine powder of snow-white polymeric formaldehyde having an inherent viscosity of 2.87. This polymer was molded at 190° C. and 1500 lbs. ram pressure for one minute to produce a tough, translucent film.

As an alternative to the above described procedure, the prepolymerization scrubbers may contain an amount of cyclohexane which is just sufficient to wet the walls of the reaction chamber or any packing contained therein.

Certain specific conditions of temperature, formaldehyde and catalyst concentration, etc., have been used in the examples. It is to be understood that these are not to be construed as limitations but simply as illustrative of practical embodiments of this invention. The essential element of this invention is a step of prepolymerization of the monomeric formaldehyde prior to the major polymerization. It is believed that such a step effects a removal of undesirable impurities from the monomer or the reaction medium, or both, depending on the site of the prepolymerization. In some embodiments of this invention the monomeric formaldehyde may be prepolymerized prior to introduction into the polymerization reactor, while in other embodiments the monomeric formaldehyde may be in contact with the reaction medium when prepolymerization takes place. In the latter case it may be that the monomer is purified, or that the reaction medium is purified, or that both the monomer and the reaction medium are purified. In any case, the inclusion of such a prepolymerization step in the preparation of high molecular weight formaldehyde polymers has been found uniformly to produce polymers of higher quality than processes which do not include such a step.

In a batch process it is preferable to introduce monomeric formaldehyde into the reactor containing the reaction medium, allow prepolymerization to occur therein, separate the prepolymer, and thereafter continue the polymerization of the remaining monomer in the same reaction medium in which the prepolymer was formed. In a continuous process it is preferable to allow the monomer to prepolymerize on the walls of the conduit through which the monomer flows, or in a liquid medium which the monomer contacts on its way to the polymerization reactor.

Depending on the characteristics of the monomer utilized in the process of this invention, the amount of prepolymer which is formed may vary. It has been found that substantially anhydrous formaldehyde, that is, formaldehyde containing less than about 0.5% by weight of water, may be subjected to a prepolymerization step in which some minor portion, not more than about 20%, of the monomer is prepolymerized. For most processes embodying this invention, at least 1% of the monomer is prepolymerized, although by using extreme care in purifying the monomer or the reaction medium there may be instances where less than 1% of the monomer may be prepolymerized in the preparation of high quality formaldehyde polymers.

It is preferable that the prepolymerization and the final polymerization be effected under substantially anhydrous conditions. A convenient way for obtaining formaldehyde in an anhydrous monomeric condition is by pyrolysis and distillation of alpha-polyoxymethylene under reduced pressure at temperatures below 0° C. It is to be emphasized, however, that this invention is intended to include the use of monomeric, anhydrous formaldehyde, whether produced from alpha-polyoxymethylene or by any other method. Small amounts of water are permissible but it is desirable that the amount of water be less than about 0.5%, and preferably less than about 0.1%.

The final polymerization, and in some embodiments of this invention, the prepolymerization step, is normally effected in an anhydrous organic medium which is inert to formaldehyde and to the catalyst, which remains liquid under the conditions used in the polymerization, and which may be either a solvent or a non-solvent for the monomeric formaldehyde, but is a non-solvent for the polymer. Usefully employable media are the ethers, such as diethyl ether and dimethyl ether, aromatic hydrocarbons, such as benzene, xylene, and toluene, chlorinated hydrocarbons such as methylene chloride, aliphatic hydrocarbons, and cycloaliphatic hydrocarbons. The preferred reaction media are the hydrocarbons containing 3 to 10 carbon atoms in the molecule.

The amount of reaction medium is not too critical and is determined only by the economics of the reaction. When the amount of reaction medium is very small compared to the final polymer which is formed, the mixture of polymer and reaction medium becomes very thick and difficult to handle, and on the other hand the employment of very large amounts of reaction medium compared to the polymer which is formed is uneconomical. It has been found that for most embodiments of this invention from 1 to 1000 parts of reaction medium per part of formaldehyde polymer may be economically employed, although from about 4 to 100 parts of reaction medium are preferable.

The best results from the standpoint of polymer yield are obtained when the polymerization, both the final polymerization and the prepolymerization, is effected under non-oxidizing conditions. A convenient way for obtaining such conditions is by sweeping the system with an inert gas and polymerizing under a blanket of inert gas. A suitable inert gas is nitrogen.

The use of a polymerization initiator in the process of this invention is not necessary, although it is preferably included in the final polymerization step. It is not intended that this invention be limited by the inclusion or omission of an initiator in either the prepolymerization step or the final polymerization step. However it is believed to be desirable to explain how initiators may be utilized in certain embodiments of this inventon. Any suitable initiator for the polymerization of formaldehyde may be used in the practice of this invention. Included among the initiators are primary, secondary, and tertiary aliphatic, including cycloaliphatic, amines and primary aromatic amines. Examples of such amines are methyl, ethyl, butyl, octyl, decyl, dodecyl, and octadecyl amines, dibutylamine, ethyloctylamine, tributylamine, trihexylamine, octadecyldimethylamine, cyclohexylamine, diethylcyclohexylamine, dicyclohexylamine, N-methylcyclohexylamine, decahydronaphthylamine, aniline, toluidine, and the like. Alkylamines, in which the alkyl group has from 1 to 5 carbon atoms, are the amine catalysts which are preferred because of their availability and relatively low cost. Other catalysts that may be used as polymerization initiators include hydrazines, morpholines, polymeric substances containing tertiary-amino-nitrogen, as described in copending application Serial No. 365,278, filed by M. F. Bechtold and R. N. MacDonald on June 30, 1953, and those described and claimed in copending application Serial No. 365,235, filed by R. N. MacDonald on June 30, 1953.

The amount of catalyst which is used may, in some instances, be barely more than a trace, but in most embodiments of this invention is not less than about 0.00005 mole percent of the formaldehyde to be polymerized. The use of more than 10 mole percent of catalyst has no advantage and this therefore represents a pratical upper limit of catalyst concentration. In most cases, the best results are obtained by using from 0.00005 to 0.05 mole percent of catalyst, and therefore such limits constitute the preferred amount of catalyst employed in this process.

It has been found that a convenient method of introducing the catalyst into the reaction medium is to employ a solution in which the solute is the catalyst and the solvent is the same organic liquid as the reaction medium. In certain embodiments of this process, the catalyst may be introduced into the reaction medium in an undiluted form in dropwise fashion or the entire amount added at one time. The addition of catalyst is accompanied by an evolution of heat, and since it is desirable to maintain the reaction temperature within the limits selected for the operation, the preferred and more practical method is to add the catalyst in a dilute solution, adding it to the reaction mixture slowly, in a dropwise fashion, and thus causing no undue surges of temperature.

The temperature of the polymerization reaction may vary from the melting point to the boiling point of the reaction medium although at atmospheric pressure, temperatures from about −110° C. to about 100° C. are preferred for most embodiments of this invention. At superatmospheric or subatmospheric pressures, these temperature ranges may vary from those specified above. These temperature conditions apply to both the prepolymerization and the final polymerization steps, although it is to be understood that each of these polymerization steps may take place under different or the same operating conditions of temperature, pressure, concentrations, catalysts, etc.

The process of this invention yields tough, plastic high molecular weight, tractable formaldehyde polymers which may be converted to films, funicular structures such as filaments and fibers, tapes, and other articles having a high degree of toughness and other desirable qualities. In contrast to the present invention, other known processes do not incorporate the scavenging step of the present invention and thereby fail to produce such high quality formaldehyde polymers. For example, the known bulk polymerization process produces unstable polyoxymethylenes, while the solution polymerization process produces low molecular weight, brittle polyoxymethylenes.

Films prepared from the formaldehyde made in accord with this invention are vastly superior in retention of toughness when compared to films prepared from formaldehyde polymers made in accord with the prior art. Thus, films 3–7 mils in thickness, were tested by heating them at 105° C. in a circulating oven for 7 days, and then subjected to a series of creasing cycles. Each creasing cycle consisted of folding and creasing the film on itself and then reversing the fold through 360° and creasing the film along the same line. Polymers made according to this invention produced films which withstood more than 100 such cycles without cracking or breaking. This is a degree of toughness unattained by films made from formaldehyde polymers of the prior art.

I claim:
1. A process for producing a tough, stable, high molecular weight polymer of formaldehyde comprising the consecutive steps of forming a liquid reaction medium by introducing monomeric formaldehyde, containing less than 0.1% by weight of water, into an organic liquid from the group consisting of ethers, aromatic hydrocarbons, chlorinated hydrocarbons, aliphatic hydrocarbons, and cycloaliphatic hydrocarbons, maintaining the said reaction medium as a liquid at a temperature of −80° C. to −15° C. and at substantially atmospheric pressure until

1%–20% by weight of said monomeric formaldehyde has polymerized to form particles of solid prepolymer, removing said prepolymer from said reaction medium, introducing into said reaction medium, after removal of the said prepolymer, 0.00005 to 0.05 mol percent, based on said monomeric formaldehyde, of a polymerization initiator from the group consisting of aliphatic amines, cycloaliphatic amines, and primary aromatic amines, maintaining the conditions of temperature and pressure at −80° C. to +25° C., and recovering a tough, stable, high molecular weight polymer of formaldehyde.

2. The process of claim 1 in which the said organic liquid is a hydrocarbon having 3–10 carbon atoms per molecule.

3. The process of claim 1 in which the said initiator is an alkylamine in which each alkyl group of said alkylamine has 1–5 carbon atoms.

4. The process of claim 1 in which the amount of said reaction medium is 4–100 parts by weight per part of said polymer of formaldehyde.

References Cited in the file of this patent

UNITED STATES PATENTS 2,296,249   Austin et al. _____ Sept. 22, 1942

OTHER REFERENCES

Walker: Jour. Am. Chem. Soc., 55, 2821–2826 (1933).
Walker, "Formaldehyde," pages 91–94, published by Reinhold Publishing Corp., 1944.